(12) United States Patent
Hana et al.

(10) Patent No.: US 9,286,934 B2
(45) Date of Patent: Mar. 15, 2016

(54) DATA DUPLICATION IN TAPE DRIVES

(75) Inventors: Andrew Hana, Bristol (GB); Gregory Trezise, Wells Somerset (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 121 days.

(21) Appl. No.: 14/364,486

(22) PCT Filed: Feb. 6, 2012

(86) PCT No.: PCT/US2012/024002
§ 371 (c)(1),
(2), (4) Date: Jun. 11, 2014

(87) PCT Pub. No.: WO2013/119201
PCT Pub. Date: Aug. 15, 2013

(65) Prior Publication Data
US 2014/0340778 A1    Nov. 20, 2014

(51) Int. Cl.
*G06F 3/06*      (2006.01)
*G11B 20/12*     (2006.01)
*G11B 20/10*     (2006.01)
*G06F 17/30*     (2006.01)

(52) U.S. Cl.
CPC .......... *G11B 20/1201* (2013.01); *G06F 3/0641* (2013.01); *G11B 20/10268* (2013.01); *G11B 20/12* (2013.01); *G06F 3/0682* (2013.01); *G06F 17/3015* (2013.01); *G11B 2020/1292* (2013.01); *G11B 2220/956* (2013.01)

(58) Field of Classification Search
CPC .. G06F 3/0641; G06F 3/0682; G06F 17/3015
USPC ................................. 711/111, 162
See application file for complete search history.

(56) References Cited

U.S. PATENT DOCUMENTS

| 8,028,106 | B2 | 9/2011 | Bondurant et al. |
| 2009/0013129 | A1 | 1/2009 | Bondurant |
| 2009/0019246 | A1* | 1/2009 | Murase .......................... 711/162 |
| 2009/0234855 | A1* | 9/2009 | Hirsch et al. ...................... 707/6 |
| 2010/0088486 | A1 | 4/2010 | Wideman |
| 2010/0125553 | A1 | 5/2010 | Huang et al. |

(Continued)

OTHER PUBLICATIONS

International Searching Authority, International Search Report and the Written Opinion, PCT/US2012/024002, HP reference 82900615, Sep. 21, 2012, 9 pages.

(Continued)

*Primary Examiner* — Than Nguyen
(74) *Attorney, Agent, or Firm* — Hewlett Packard Enterprise Patent Department

(57) ABSTRACT

A method and apparatus for data de-duplication is disclosed. Use de-duplication engine (DDE) divides data into regions. The DDE processes the regions in a serial fashion. The DDE clears its hash table before processing the first region. Each region is divided into a number of chunks. A hash is generated for each chunk in a region. When a hash for a chunk is not in a hash table, the hash is stored in the hash table and the chunk is stored on media. When the hash is a duplicate of a hash already in the table, the hash and chunk are discarded and a reference to the previously stored chunk is stored to the media. The DDE does not retain all the hashes from all the regions in the hash table at the same time. The DDE only retains the hashes for the current region being processed and N previous regions where N is a positive integer greater than zero.

15 Claims, 2 Drawing Sheets

(56) References Cited

U.S. PATENT DOCUMENTS

| | | |
|---|---|---|
| 2011/0072291 A1 | 3/2011 | Murase |
| 2011/0113016 A1 | 5/2011 | Gruhl et al. |
| 2011/0307447 A1 | 12/2011 | Sabaa et al. |
| 2011/0307456 A1 | 12/2011 | Jayaraman et al. |
| 2012/0159098 A1* | 6/2012 | Cheung et al. ............... 711/162 |

OTHER PUBLICATIONS

Tianming Yang et al. 3DNBS: A Data De-duplication Disk-based Network Backup System 2009 IEEE International Conference on Networking, Architecture, and Storage, pp. 287-294, Jul. 9-11, 2009 See part (II), pp. 287-290.

* cited by examiner

DATA DUPLICATION IN TAPE DRIVES

BACKGROUND

Data may contain duplicated information. For example, a test document may have multiple revisions stored onto a disk. Each revision may contain sections or pages that did not change between revisions. When storing the document, the data may be reduced by only storing the unchanged sections or pages once, and placing a reference to the stored section in the other documents where the duplicate section occurred. This type of data storage is typically called de-duplication.

When storing data using de-duplication the data is divided into chunks and each chunk is hashed. If the hash has never been seen before the hash is stored in a hash table and the data for that chunk is stored. If the hash tor the current chunk is already in the hash table, a copy of a chunk containing the identical data has already been stored. Therefore only a reference to the previously stored data is stored. Using this method, only a single copy of each chunk of data is stored.

When storing large quantities of data using a de-duplication method,, large numbers of chunks are generated. For example, using a chunk size of 4 Kbytes and storing 4 Terabytes (Tbytes) of data would generate $1 \times 10^9$ hashes. Assuming each hash and its related metadata require 64 bytes, a total of 64 G bytes of storage would be required to store the hash table, assuming no duplication. The de-duplication engine typically requires random access to the hash table. Therefore a typical de-duplication engine uses a hard disk drive (HDD) to store the hash table.

Tape drives have the ability to randomly access data on a tape, but access is very slow compared to hard disk drives. Tape drives also have poor granularity of access compared to disks. Many tape drives do not contain a HDD.

DETAILED DESCRIPTION

Figure 1:
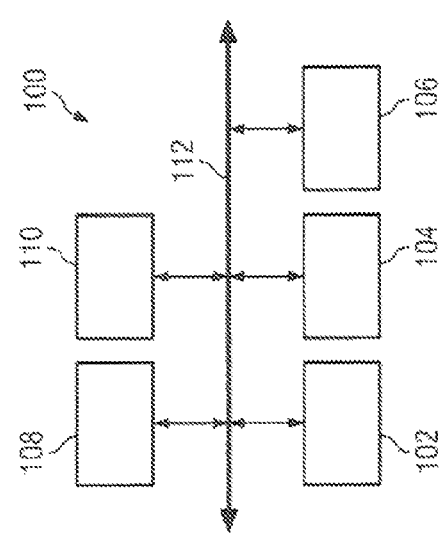
FIG. 1 is a block diagram of a tape drive 100 in an example embodiment of the invention.
Figure 2:
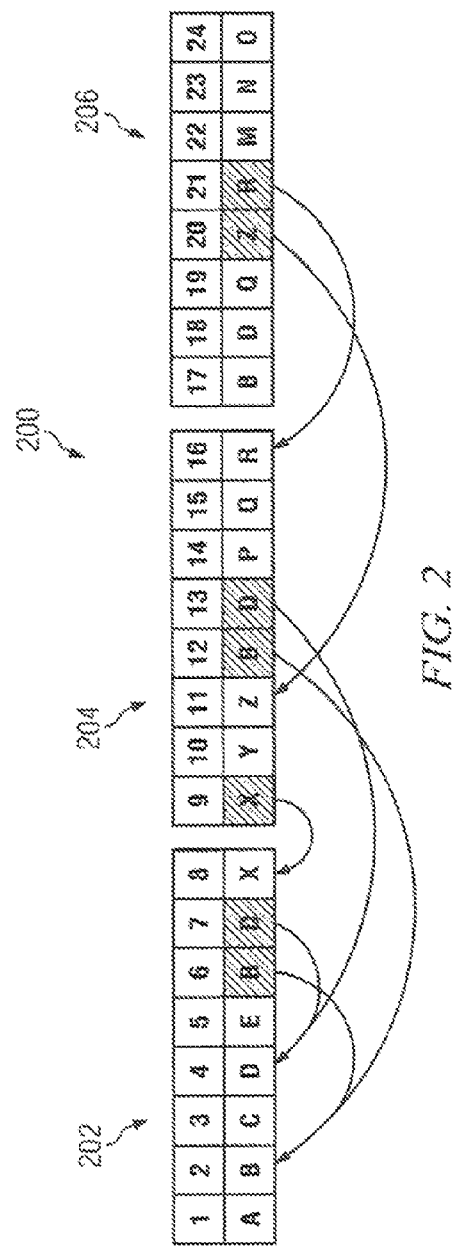
FIG. 2 is a diagram of data 200 to be stored in an example embodiment of the invention.
Figure 3:
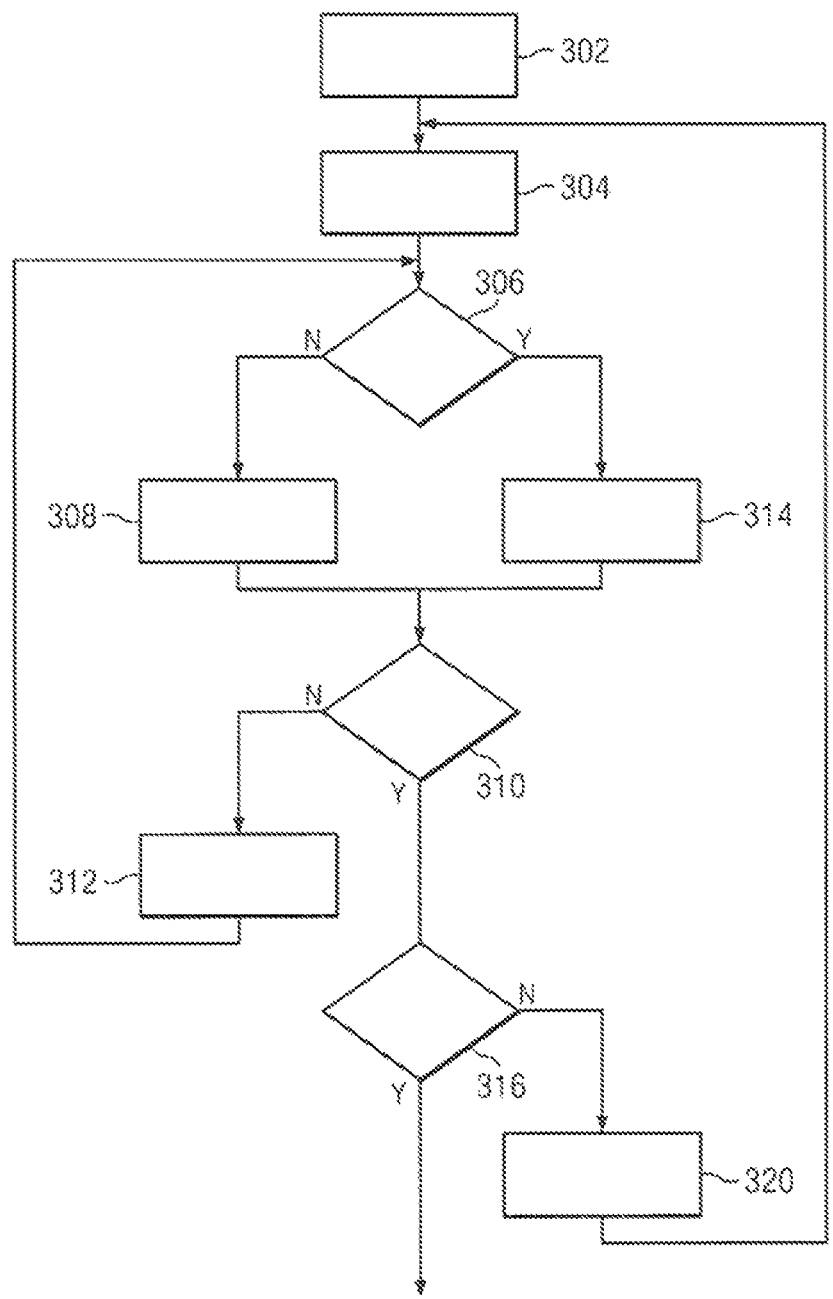
FIG. 3 is a flow chart for a method of de-duplication in an example embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fail within the scope of the invention. Those skilled In the art will appreciate that the features described below can be combined in various ways to form multiple variations of the invention. As a result, the invention is not limited to the specific examples described below, but only by the claims and their equivalents.

In one example embodiment of the invention, a tape drive will do de-duplication on smaller subsets or regions of the data to be stored, Bach region of data will generate a set of bashes. The tape drive will use bashes from the current region plus one or more previous region during de-duplication. Each stored chunk will have an identifier to indicate which region of the data the chunk came from. Using this method there is no need to store the hash table to the tape, as explained below.

FIG. 1 is a block diagram of a tape drive 100 In an example embodiment of the invention. Tape drive 100 comprises controller 103, memory 104, I/O module 106, tape drive system 108, read/write system 110 and bus 112. Controller 102, memory 104, Input/output (I/O) module 100, tape drive mechanism 10$ and read/write system 110 are coupled to bus 112 and thereby interconnected. Controller 102 may comprise a processor, an application specific integrated circuit (ASIC) or combinations thereof. Memory 104 comprises one or more types of random access memory (RAM) as well as read only memory (ROM), Memory is used to store computer readable instruction as well as data. Controller accesses and executes the computer readable instructions to cause tape drive 100 to perform actions, I/O module couples tape drive 100 to external communication systems, for example the Internet. Tape drive system 108 controls loading and positioning of tapes in tape drive 100. Tape drive system comprises motors, tape servo systems, tape loading mechanisms and the like.

Read/write system reads and writes data to tapes loaded into tape drive 100. Read/write system comprises tape heads, data buffers, tape head servos systems, de-duplication engines and the like. When data is to be stored or read from the tape using de-duplication, the de-duplication engine is used. The de-duplication engine may be control led by the read/write system 110, the controller 102 or a combination thereof. De-duplication engine may contain its own processor and/or memory or may use the processor in controller 102 and/or memory 104.

When, storing data onto a tape, the de-duplication engine (DDE) divides the data Into a plurality of regions. The region size may be a fixed size or a variable size. The region size is dependent of the amount of hardware resources dedicated to the DDE. One hardware limit is the size of the memory allocated to the hash table. The region sixe will also be influenced by the size of the data typically stored onto the media. For example, when using a Linear Tape Open (LTO) tape the region size may be between 3 and 4 Mbytes. When using a Digital Data Storage (DDS) tape, the region size may only be 1-4 Mbyte. The DDE processes each region in a serial fashion. Before processing any regions the DDE clears Its hash table. The DDE divides each region into a plurality of chunks.

The regions can be divided into chunks using a number of different methods or algorithms. Some chunking algorithms use fixed size chunks, so each region would have the same number of chunks. Other chunking algorithms, for example TTTD, create variable sized chunks. A hash is generated for each chunk. Any type of hashing may be used, for example a secure hash algorithm (SHA).

Each unique hash is stored into a hash table and its corresponding data chunk is stored to the tape. If a hash is a duplicate and a copy of the hash is already stored in the hash table, the duplicate hash and its data chunk are discarded and a reference to the previously stored data chunk is stored to the tape. The amount of data stored in each region varies. Evan when the regions are a fixed size, the amount of data contained in each region will vary depending on the number of chunks that are de-duplicated. The more de-duplication that occurs, the more data the region will store. The DDE does not keep all the hashes from all the regions in tire hash table at the same time. The DDE only keeps the hashes from the current region it is processing and N previous regions in the hash table at the same time, where N is a positive integer greater than zero.

FIG. 2 is a diagram of data 200 to be stored in an example embodiment of the invention. In this example, a chunking algorithm using fixed size chunks is used for clarity. The data to be stored is divided into three regions (202, 204, and 206) with each region divided into 8 chunks. Each chunk is numbered for clarity. The letters refer to user data and its equivalent hash. In this example N will be set to 1 such that only the hashes from two regions will be stored In the hash table at a time. Region 202 is the first region for data 200, so the hash table is cleared before processing region 202.

The DDE will set region 202 as the current region and begin processing the region. Chunks 1-5 of region 202 each have a unique hash. The DDE will process chunks 1-5 of region 202 by putting each unique hash into the hash table and storing the data chunks onto tape. Chunk 6 of region 202 is a duplicate hash of chunk 2 of region 202. The DDE will discard the hash from chunk 6, discard chunk 6 and store a reference to chunk 2 of region 202 onto tape. Chunk 7 is a duplicate of chunk 4 and will be processed In a similar manner as chunk 6. Chunk 8 is unique and its hash will be stored in the hash table and the data will be stored to tape. Region 202 has now been fully processed.

The DDE will now set region 204 as the current region and set region 202 as the previous region. Because N is set at 1, the hashes from only 1 previous region will be kept in the hash table. Therefore the hashes from region 202 will remain in the hash table while region 204 is being processed. The hash from the first chunk in region 204 (chunk 9) is a duplicate of chunk 8 from region 202. Because the hashes from region 202 (the previous region) are still in the hash table, the hash from chunk 9 in region 204 will be discarded and a reference to chunk 8 in region 202 will be stored to tape.

Chunks 10, 11 and 14-16 of region 204 each have hashes that are not currently in the hash table. The DDE will process chunks 10, 11 and 14-16 of region 204 by putting each hash info the hash table and storing the chunks onto tape. The DDE will process chunks 12 and 13 of region 204 before processing chunks 14-16. Chunk 12 of region 204 has a hash that is a duplicate of a hash that is currently in the hash table (hash 2 from region 202). Therefore the hash from chunk 12 of region 204 will be discarded, chunk 12 will be discarded and a reference to chunk 2 of region 202 will be stored to tape. Note that the reference tor chunk 12 is to chunk 2 of region 202 and not to chunk 6 of region 202. That's because chunk 6 of region 202 was a duplicate of chunk 2. Therefore the hash from chunk 6 was discarded and only the hash from chunk 2 is in the hash table. In addition the data from chunk 6 was not stored to tape, only a reference to chunk 2 was stored to tape. Chunk 13 in region 204 is also a duplicate of a hash currently stored in the hash table. Therefore chunk 13 of region 204 will be processed in a similar fashion to chunk 12.

Region 204 has now been fully processed. The DDE will now set region 206 as the current region and set region 204 as the previous region. Because N is set at 1, the hashes from only 1 previous region will be kept in the hash table. Therefore the hashes from region 202 will be cleared from the hash table, but the hashes from region 204 will remain in the hash table while region 206 is being processed. When N is larger than 1, the hashes from more regions will be stored in the hash table.

The hash from the first chunk in region 206 (chunk 17) is a duplicate of chunk 12 from region 204, The hashes from region 204 (the previous region) are still in the hash table. However, the hash from chunk 12. In region 204 was a duplicate of a hash from chunk 2 in region 202, Therefore the hash from chunk 12 in region 204 was discarded and was not put into the hash table. The hash from chunk 2 in region 202 has now been, cleared from the hash table. Therefore she hash in chunk 17 of region 206 is not currently in the hash table, so the hash from chunk 17 will be stored in the hash table and the data from chunk 17 in region 206 will be stored to tape. The hash from chunk 18 is similar to the hash from chunk 17 and will be processed in the same way.

The hash from chunk 20 in region 206 is a duplicate of chunk 11 from region 204. Because the hashes from region 204 (the previous region) are still in the hash table, the hash from chunk 20 in region 206 will fee discarded and a reference to chunk 11 in region 204 will be stored to tape. The hash from chunk 21 in region 206 is a duplicate of chunk 16 from region 204. Because the hashes from region 204 (the previous region) are still in the hash table, the hash from chunk 21 in region 206 will be discarded and a reference to chunk 16 in region 204 will be stored to tape. Chunks 22-24 of region 206 each have hashes that are not currently in the hash table. The DDE will process chunks 22-24 of region 206 by putting each hash into the hash table and storing the data chunks onto tape. The processing of region 206 is now complete and all the data 200 has been stored to tape.

The chunk size is driven by the likely size of repeated sections in the incoming data. When the repeated sections in the data are of the same order of size as the chunks, they are likely to be missed. But if the chunk size is too small the necessary meta-data tor chunks starts to be a significant fraction of the data chunks that are removed, thereby reducing the effectiveness of the de-duplication. Increasing the size of the chunk reduces the probability of de-duplication for that chunk but also reduces the number of hashes that need to be stored in the hash table. Therefore there is an optimum hash size based on the hardware resources and the data to be de-duplicated.

The amount of data to be stored in the hash table is dependent on the region size, the chunk size, and the number N of previous regions of hashes that will be stored in the hash table. The number N of previous regions of hashes stored in the hash table is typically between 2 and 10. The typical chunk size for a region having between 3 to 4 Mbytes is between 3 to 5 Kbytes. However, chunk, sizes may vary and may be between 1 and 16 Kbytes of data, increasing N increases the likelihood that data will be de-duplicated but also increases the sixe of the hash table.

When recovering data from the tape in a region that has been stored using de-duplication, the de-duplicated data may contain references to areas of data from previous regions. When N is equal to 1, the data may reference one previous region. When N is larger than one, the number of previous regions that may contain data from a reference in the desired region would be the desired region—N. Hence, reading must start at the desired region—N to retrieve data for the desired region. For example, when N is equal to 2, and data from region 15 is to be retrieved, reading will start at 15—2 or region 13.

All of the data for each of the previous regions can be pat into a temporary store. The data for the desired region can then recovered. As references to previous regions are encountered, the references can fee satisfied with data already in the temporary store. When more than one consecutive region is to be read, the data from region—N can be discarded once the data from the currently desired region has been read. In this way only N+1 regions of data need to be kept in the temporary storage location at any one time (i.e. the previous regions plus the current or desired region).

The data from previous regions may contain chunks of data and/or references to chunks in other regions. The references to chunks in other regions may contain the length of the de-duplicated data. The location or head of the following chunk can be determined using the length of de-duplicated data. In other examples pointers to the head or start of following chunks may be stored as part of the de-duplicated reference.

FIG. 3 is a flow chart for a method of de-duplication in an example embodiment of the invention. At step 302 the dais is divided into a plurality of regions, the hash table is cleared, and the first region is set as the current region. The region size may be a fixed size or a variable size. At step 304 the current region is divided into a plurality of chunks, a hash is generated for each chunk and the first chunk is set as the current chunk. The chunk size may be a fixed size or a variable size. At step 306 the hash table is searched to see if the hash from the current chunk is stored in the hash table. If the hash from the current chunk is not in the hash table flow continues at step 308. At step 308 the hash from the current chunk is stored in the hash table and the chunk is stored to media. At step 310 a check is made to see if the current chunk is the last chunk in the region. When the current chunk is not the last chunk, the nest chunk is set as the current chunk in step 313 and the flow returns to step 306.

At step 306 when the hash horn the current chunk is in the hash table flow continues at step 314. At step 314 the hash from the current chunk and the current chunk are discarded and a reference to the previously stored chunk is stored to the media. The reference includes the region the previously stored chunk is from. Flow then continues to step 310. When the current chunk is the last chunk at step 310 flow continues at step 316. At step 316 a check is made to determine if the current region is the fast region. If the current region is the last region the process ends. When the current region is not the last region, flew continues at step 320. At step 320 the next, region is set to the current region and the hash table is cleared of all hashes except for the hashes lot the current region and N previous regions, where N is a positive integer greater than zero. Flow then returns to step 304.

A necessary part of most existing tape formats (for example the LTO tape format) is that when data is written to the tape, data is stored a block at a time, with error correction code (ECC) being computed over, and stored with, the block. In LTO terminology a block of data is called a "dataset". The write process is: accumulate a block's worth of data in memory, add ECC to the block, and then write the block to tape. Therefore, in this patent, "write data to tape" indicates that the data goes through she normal write process where data is accumulated, ECC is added, and then the data block is written to tape. This write process is a standard part of the typical tape drive design and the de-duplication described in this application is independent from it.

Data is also read from tape a data block at a time. Therefore in this patent "reading a region from the tape" indicates that a data block is read and the ECC is checked before the region is put into temporary storage for use by the de-duplication engine.

The examples above describe storing data to a tape. Other types of media may be used.

What is claimed is:

1. A tape drive, comprising:
a de-duplication engine (DDE) to divide data into a plurality of regions;
the DDE having a hash table, the DDE clearing the hash table before processing a first of the plurality of regions;
the DDE serially processing each of the plurality of regions by:
dividing each region into a plurality of chunks;
generating a hash for each of the plurality of chunks in the region;
storing each hash that is not currently in the hash table into the hash table and storing the corresponding chunk onto a tape;
discarding each hash already stored in the hash table and discarding its corresponding chunk and storing a reference to the previously stored chunk onto the tape:
the DDE retaining in the hash table only the hashes for a current region being processed and N previous regions where N is a positive integer greater than zero.

2. The tape drive of claim 1, wherein the hash table is not stored to the tape.

3. The tape drive of claim 1, wherein the reference includes which of the plurality of regions the previous stored chunk is from.

4. The tape drive of claim 1, wherein a region size is variable.

5. The tape drive of claim 1, wherein a chunk size inside each of the plurality of region is variable.

6. The tape drive of claim 1, wherein N is between 2 and 10.

7. The tape drive of claim 1, wherein the region size is between 2 and 5 Mbytes and the chunk size is between 3 and 5 KBytes.

8. The tape drive of claim 1, wherein the data is stored to the tape using an Linear Tape Open (LTO) format.

9. The tape drive of claim 1, wherein data for a desired region is read from the tape by first reading data from N previous regions.

10. A method for storing data, comprising
computer executable code stored in memory, that when executed by a processor, performs the following steps:
dividing the data into a plurality of regions;
clearing a hash table before processing a first of the plurality of regions;
serially processing each of the plurality of regions by:
dividing each region into a plurality of chunks;
generating a hash for each of the plurality of chunks in the region;
storing each hash that is not currently in the hash table into the hash table and storing the corresponding chunk onto a media;
discarding each hash already stored in the hash table and discarding its corresponding chunk, and storing a reference to the previously stored chunk onto the media;
retaining in the hash table only the hashes for a current region being processed and N previous regions where N is a positive integer greater than zero.

11. The method of claim 10, wherein the hash table is not stored to the media.

12. The method of claim 10, wherein the reference includes which of the plurality of regions the previous stored chunk is from.

13. The method of claim 10, wherein the media is a tape.

14. The method of claim 10, wherein a chunk size for the plurality of chunks inside each region is not a fixed size.

15. The method of claim 10, wherein data for a desired region is read from the media by first reading data from N previous regions.

* * * * *